No. 867,985. PATENTED OCT. 15, 1907.
S. LAKE.
APPARATUS FOR LOCATING SUBMERGED OBJECTS.
APPLICATION FILED MAR. 22, 1907.
4 SHEETS—SHEET 1.
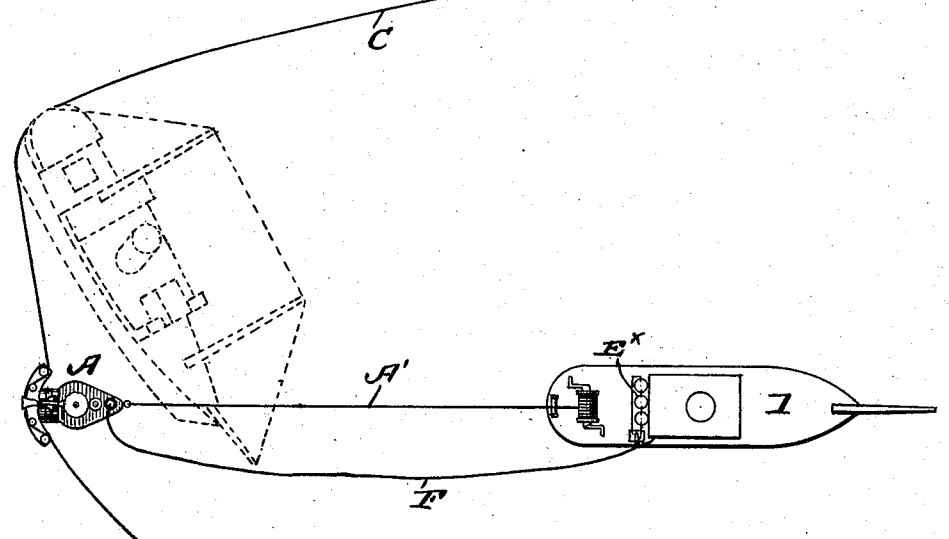
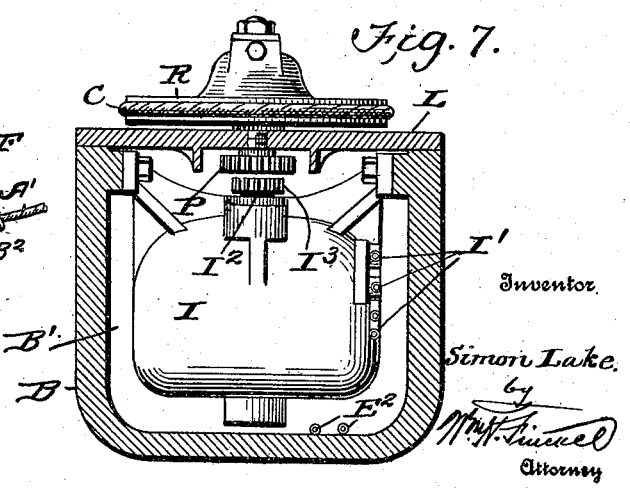
Witnesses
M. D. Blondel
M. Hildebrand
Inventor
Simon Lake.
by
Attorney No. 867,985. PATENTED OCT. 15, 1907.
S. LAKE.
APPARATUS FOR LOCATING SUBMERGED OBJECTS.
APPLICATION FILED MAR. 22, 1907.
4 SHEETS—SHEET 2.
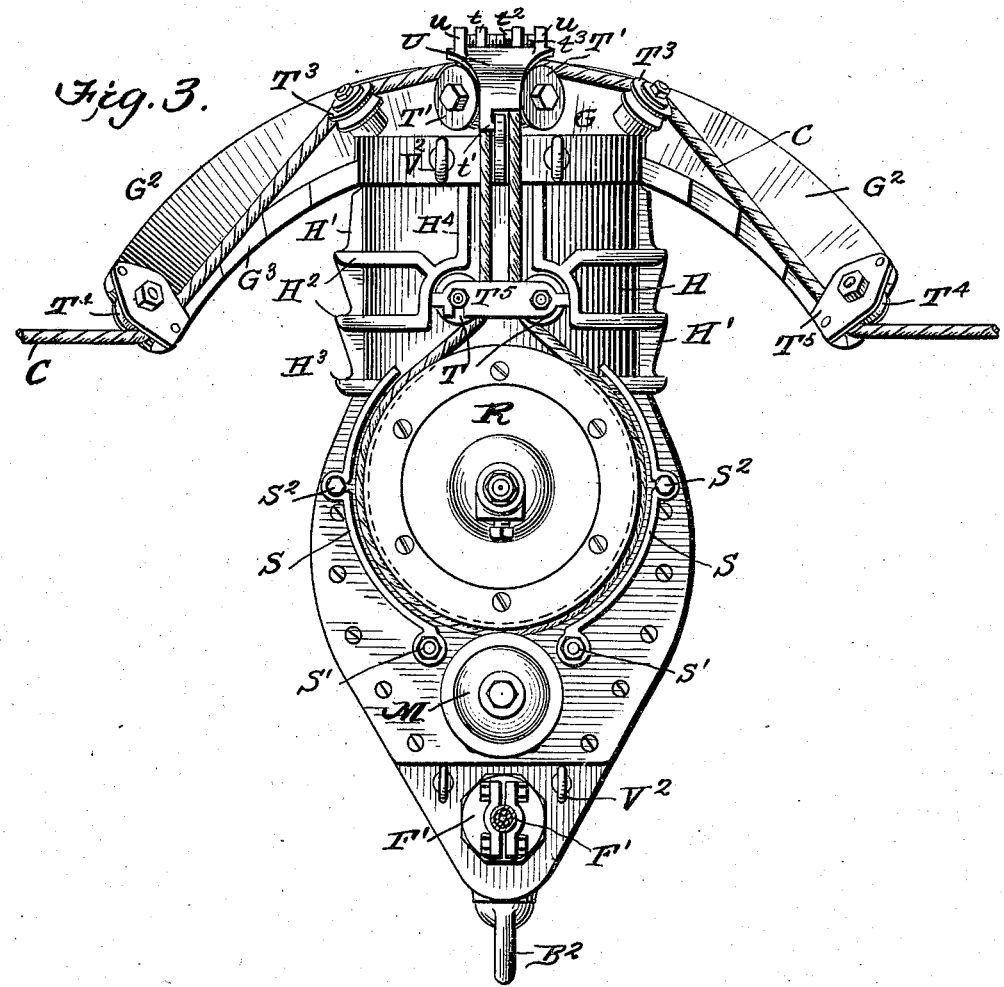
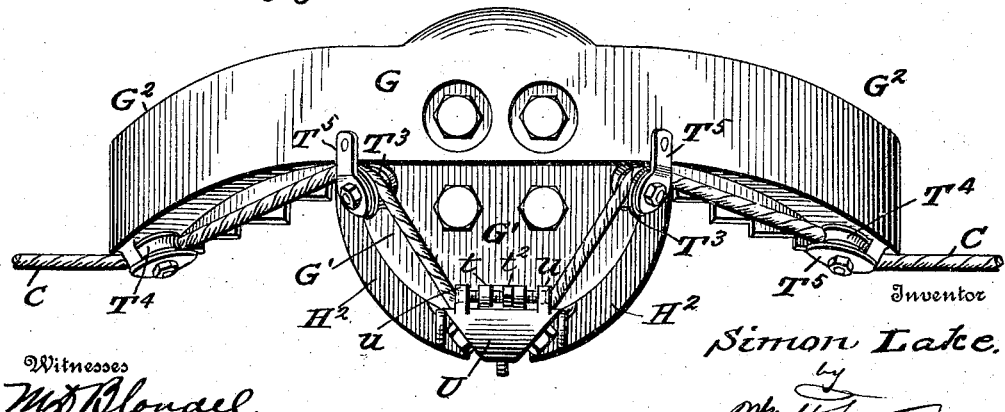

No. 867,985. PATENTED OCT. 15, 1907.
S. LAKE.
APPARATUS FOR LOCATING SUBMERGED OBJECTS.
APPLICATION FILED MAR. 22, 1907.
4 SHEETS—SHEET 3.
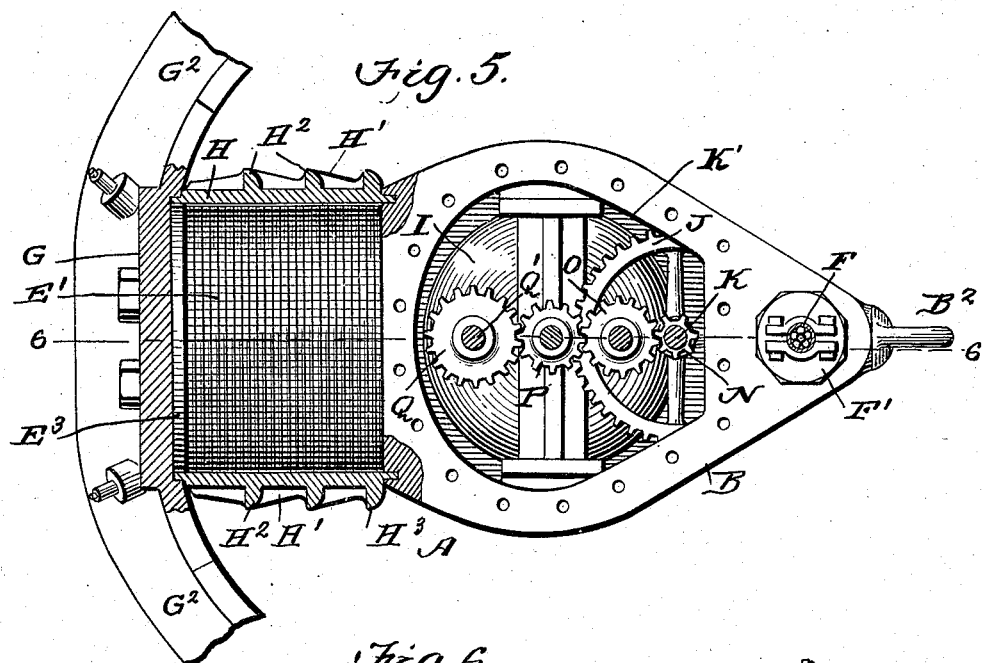
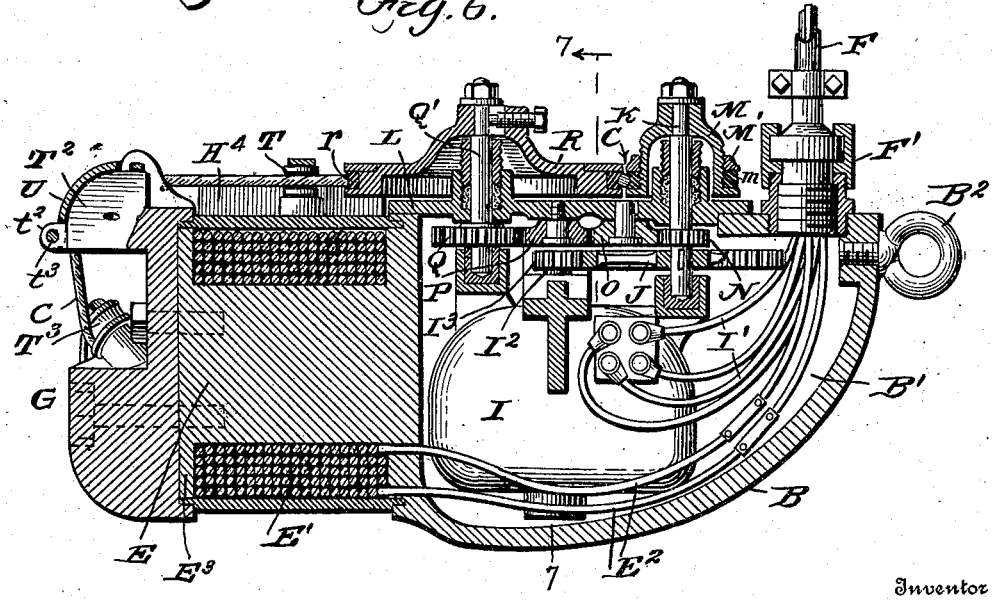
Witnesses
M. D. Blondel.
M. Hildebrand.
Inventor
Simon Lake.
by
Wm. H. Finckel
Attorney

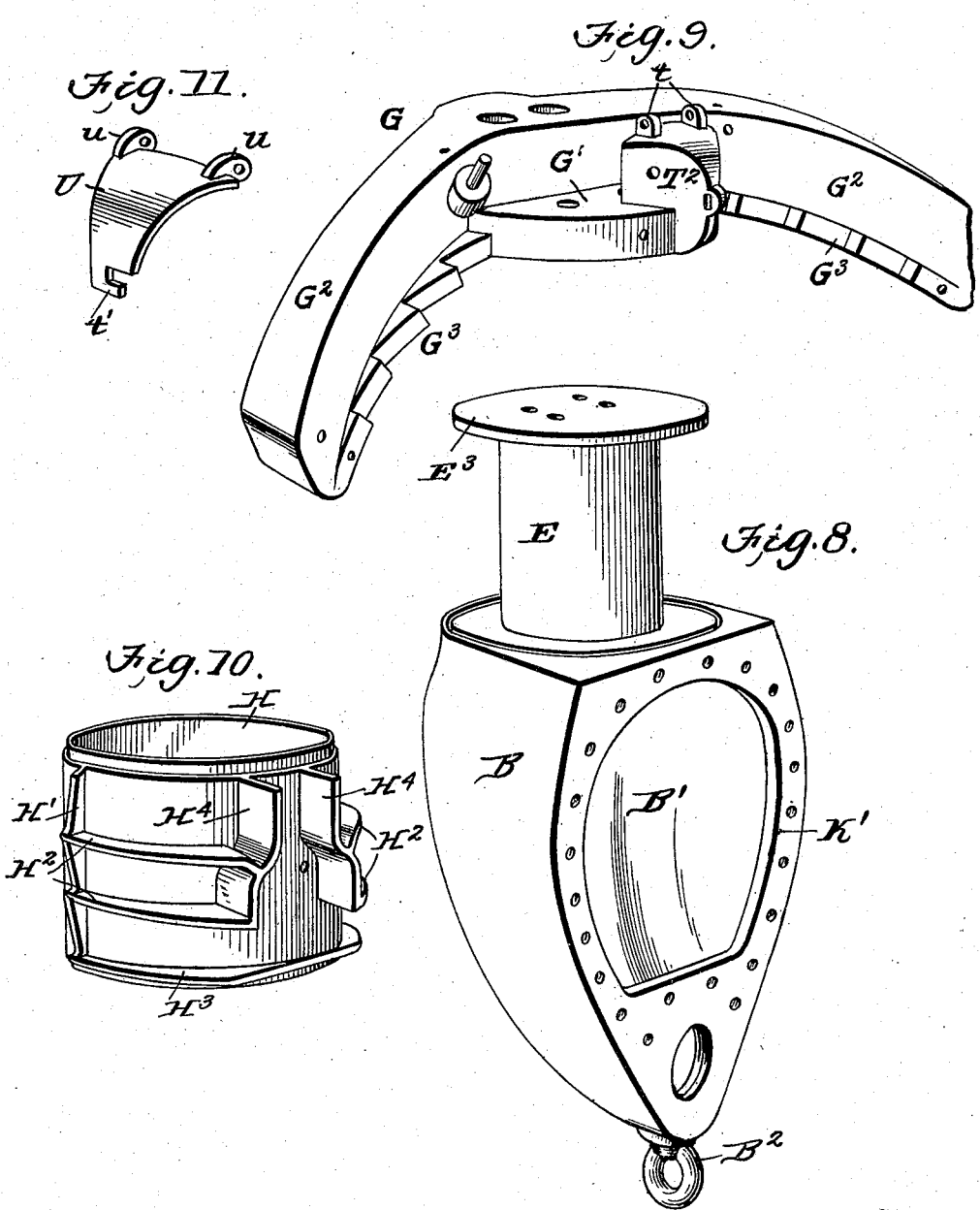

UNITED STATES PATENT OFFICE.

SIMON LAKE, OF BERLIN, GERMANY.

APPARATUS FOR LOCATING SUBMERGED OBJECTS.

No. 867,985.　　　　Specification of Letters Patent.　　　　Patented Oct. 15, 1907.

Application filed March 22, 1907. Serial No. 363,942.

*To all whom it may concern:*

Be it known that I, SIMON LAKE, a citizen of the United States, at present residing at 23 Friedrich Wilhelm strasse, Berlin, Germany, have invented a certain new and useful Apparatus for Locating Submerged Objects, of which the following is a full, clear, and exact description.

This invention relates to an improved device for locating sunken vessels and other objects, concealed beneath the surface of the water.

The special feature of the improvement is a crab or finder proper, which travels upon or immediately adjacent to the water bed and by which the nature of the obstruction encountered may be ascertained.

The object of the invention is to provide a finder or crab with propelling devices to cause it to travel along a sweep line, when the latter engages an obstruction, and having a magnet capable of temporary energization, so that the finder would be attracted by and become attached to the object, should the latter be an anchor, the hull of an iron ship, or any metallic part of a ship, and by the additional strain placed upon the tow or sweep line caused by the crab adhering to the object, notify the attendants on the surface vessel that the object sought had been located; the crab being so constructed that if the object be an anchor it may be lifted to the surface vessel by the tow line connected to the crab and by energizing the magnet coil and converting the crab into a magnet, to cause the object to hold fast to the crab and thus lessen the liability of its being detached while being lifted to the surface. Should, however, the obstruction be the hull of a ship, other methods such as shown and described in an application filed by me December 12, 1906, Serial No. 347,566, would be employed for raising it. As is often the case in the employment of a sweep line in searching for sunken vessels, the line will encounter a boulder or similar projection, and heretofore no provision has been made for positively ascertaining the nature of the obstruction, and in consequence a diver has to be sent down for this purpose, but with my device the crab or finder is energized and if the obstruction should be a boulder, of course, the latter would have no influence upon the crab and by a continued pull of the tow line, the crab would readily slip from the object, and the vessels again started over the area to be searched.

The invention consists essentially of a self-propelling electro-magnetic crab, mounted and traveling upon a sweep line and provided with a tow line, the electric current serving not only to effect the traveling of the crab, but also to convert it into a magnet which attaches itself to any magnetic body with which it comes into contact.

The invention also comprises certain details of construction and peculiar arrangement of parts, as will be fully set forth in the following specification and pointed out in the claims.

In the accompanying drawings, illustrating the invention, in the several figures of which like parts are similarly designated, Figure 1 is a diagrammatic view illustrating the application of my invention. Fig. 2 is a side elevation of the finder or crab, showing it attached to a float to prevent the entire weight of the crab resting upon the water bed and to maintain it at all times in its proper position. Fig. 3 is a plan view of the crab or finder, and Fig. 4 is an end view of the same. Fig. 5 is a plan showing parts in section and other parts removed in order to illustrate the mechanism carried by the crab. Fig. 6 is a longitudinal section drawn on the line 6—6 of Fig. 5. Fig. 7 is a cross-section drawn on the line 7—7 of Fig. 6. Fig. 8 is a perspective view of the body portion of the crab. Fig. 9 is a perspective view of the casting having laterally extending arms or flukes. Fig. 10 is a perspective view of the sleeve or cover that is connected to the crab and which surrounds the magnet coil. Fig. 11 is a perspective view of a pulley guard.

Referring to Fig. 1, the crab or finder A is attached to a tow line or cable A′, extending from a windlass located upon a surface vessel 1, which draws the crab along the bed of the water. 2 and 3 designate surface vessels designed to travel upon each side of and at a distance from the vessel 1, and carry the opposite ends of a sweep line C, upon which the crab or finder travels. The ends of the sweep line are attached to winding drums or winches upon the decks of the vessels 2 and 3, and the said drums are provided with suitable releasing means for operating a brake device adapted to enable the drums to hold the line only under a normal strain, and permit them to pay out an extra reserve length when an obstruction is encountered, so as to relieve any undue strain imposed thereon by its encounter with the said object.

The crab consists of a metallic body B, preferably cast, and with a hollow portion B′, which is pointed at its forward end and provided with an eye $B^2$ to which the tow line or cable A′ is connected. From the rear end of the body portion extends a cylindrical projection E, which forms a core for a magnet coil E′, whose current wires $E^2$ extend from a suitable electric source, such as batteries $E^X$, carried by the surface vessel 1. The wires from the batteries extend to a switch from which they continue through a cable F, to a coupling sleeve F′ screwed or otherwise secured to the forward end of the crab.

The end of the core E terminates in a circular flange $E^3$, to which is connected a casting G, comprising a central portion G′ which fits the circular flanged end of the core and two laterally, upwardly and forwardly curved arms or flukes $G^2$, having step-like flanges $G^3$, upon their lower concave edges, which form a series of hooks to engage the object encountered and form a ledge or rest to support the object should it be of a size that may be lifted by the finder or crab by the tow line. These arms may be magnetized from the magnet coil to thereby increase their hold on any magnetic object engaged thereby.

A cylindrical sleeve H encircles the magnet coil and has its ends reduced to fit within a groove in the end of the metallic body B, and a recess in the front face of the casting G, in which the flanged end of the core also rests. Projecting from each side of the sleeve is a rib H′, which extends the full length of the sleeve and connected to the upper faces of these ribs are peripheral ribs H² and H³. The ribs H² terminate near the central portion of the sleeve in vertically projecting longitudinal ribs H⁴, which extend from the flanges H², rearwardly to the end of the sleeve. The rib H³ extends continuously from rib H′ on one side to rib H′ on the other side. These ribs also serve as a series of hooks or ledges against which the encountered object may engage and be lifted with the crab to the surface.

Within the body portion of the crab is arranged an electric motor I, whose current wires I′ extend through the coupling sleeve F′, and cable F to a suitable dynamo (not shown) carried by the surface vessel 1. The shaft I² of the motor is provided with a pinion I³ which meshes with a gear J, keyed upon a shaft K, suitably supported in the motor casing and in its cover plate. This cover plate is also utilized to cover the opening K′ in the body portion of the crab and through which access may be had to the interior. The said shaft K extends through the cover plate L and carries at its outer end a pulley M, whose lower end is flanged and its periphery adjacent to the flange threaded and having a threaded collar M′, working thereon, between which and the flange is interposed a packing of rubber or other suitable material m, which engages the sweep line.

Upon the shaft K, adjacent to the gear J, is a pinion N, which meshes with an idler pinion O, turning upon a stud bolt or shaft projecting from the plate L, and this idler pinion O also meshes with a similarly mounted idler P, which in turn meshes with a pinion Q, held upon the inner end of a shaft Q′, suitably supported in the motor casing and the plate L. The upper or outer end of the shaft carries a pulley R, the periphery of which is provided with a groove lined with rubber or other suitable material r, to insure a firm grip upon the sweep line, as it passes around the pulley.

The threaded collar M′ may be screwed up against the packing m so as to expand it peripherally and thereby press the line firmly against the pulley R and cause it to tightly bind against the line and grip it more firmly.

Guard strips S are secured to the plate L around each side of the pulley R to prevent the disengagement of the sweep line therefrom. The guard plates S are pivotally held upon bolts S′ and have their intermediate sections bent to provide U-shaped loops through which binding bolts S² are passed and which screw into the plate L. By loosening the bolts S², the plates S may be swung outwardly upon the bolts S′, and the cable readily disengaged from the pulley H. The other guard plates may be made removable also.

The line C, after passing around the pulley R, runs over pulleys T, held upon the sleeve H, and then passes over guide pulleys T′, obliquely journaled upon a lug T², extending rearwardly from the upper central portion of the casting G. From the pulleys T′ the line extends in diverging directions over guide pulleys T³, journaled upon the upper convex surface of the casting at the base of the arms and from these pulleys over guide pulleys T⁴, to the surface vessels 2 and 3. Suitable guard plates T⁵ are secured over the guide pulleys T, T³ and T⁴, to prevent accidental displacement of the line. U designates a guard plate held over the pulleys T′, and curved to snugly fit the peripheries of the pulleys. Plate U is hinged to the lug T² by ears u projecting from the plate and ears t on lug T² and a threaded bolt t³, which bolt passes through said ears. The forward end of the plate is provided with a hook t′, which fits within a recess formed in an extension projecting from the upper edge of the casting G, and which is held in engagement therewith by a nut t² operating upon the bolt t³, and binding against one of the lugs t. It will be readily apparent that when the hook of the plate is inserted in the slot, that by tightening the nut against the lug or ear the plate will be prevented from lateral movement and, therefore, securely held in position, but by slackening the nut the plate may be moved laterally, the hook disengaged from the opening and the plate swung back, thereby permitting the removal of the cable from the pulleys or its adjustment thereon.

V, Fig. 2, designates a float, which is connected to and some distance above the crab by cables V′ which are secured at their lower ends to eye bolts V² on the crab. This float prevents the entire weight of the crab resting upon the water-bed, and hence the crab may be easily drawn over the surface and also retained in its proper position or "righted" should it engage a small obstruction and be momentarily thrown out of its true position.

The float may be wholly or partly under water, and in the latter event it will serve to indicate the position of the crab.

The operation of the invention is as follows:—The sweep line is lowered from the vessels 2 and 3 and extended across the vessel 1, from which the crab or finder is connected to the sweep line when the line and crab are lowered by means of the cable A′ and allowed to rest at or adjacent to the water bed. The vessels 2 and 3 are then started and steered in diverging directions from the vessel 1, and after reaching the proper distance, they assume a parallel course with the vessel 1, and sweep the entire area to be searched. Should the sweep line engage an obstruction, the motor within the crab is started, causing the crab to travel along the sweep line towards the said obstruction with which it will engage. The magnet coil is then energized which causes the crab or finder to attach itself to the object should it be of steel or iron construction, that is to say, magnetically attractive, and then by pulling upon the tow line the nature of the obstruction to that extent can be ascertained. Should the obstruction be an anchor or other small accessory of a ship, it may be lifted by the crab proper to the surface, but, of course, if the object encountered be a ship or other large object, other methods as hereinbefore mentioned would be employed for raising it as the crab or finder had accomplished its purpose in locating the said object and the location accordingly recorded. Should the obstruction, however, be a boulder unknown and unrecorded in the navigating charts, and its nature therefore unknown, the magnet if energized will, of course, have no effect upon the obstruction, and by drawing in the tow line the crab will readily slip from the boulder. It will, therefore, be seen that a very large area may be swept and the nature of the obstruction ascertained without resorting to the necessity of sounding or lowering a diver.

What I claim is:—

1. A device of the kind described, comprising in combination with a sweep line, an electro-magnetic crab or fender mounted thereon, means carried by the crab for propelling the crab along the line, and means for supplying energy to the said means.

2. A device of the kind described, comprising in combination with a sweep line, an electro-magnetic crab mounted thereon, an electric motor carried by the crab for propelling the crab along the line, and current supplying means.

3. A device of the kind described, comprising in combination with a sweep line, an electro-magnetic self-propelling crab and means for energizing it to cause it to travel automatically along the sweep line.

4. A device of the kind described, comprising in combination with a sweep line, a crab, a drive wheel carried by the crab and around which the said sweep line passes, means for operating the wheel and also means for supplying energy to the operating means.

5. A device of the kind described, comprising in combination with a sweep line, an electro-magnetic crab mounted thereon, means carried by the crab and engaging the sweep line to propel the crab along said sweep line, means for supplying energy to the said propelling means, and current connections.

6. A device of the kind described, comprising in combination with a sweep line, an electro-magnetic crab, a drive pulley carried thereby and engaging the line, means carried by the crab for operating the pulley and means for supplying energy to the operating means and the crab.

7. A device of the kind described, comprising in combination with a sweep line and means for supporting it, an electro-magnetic crab having projecting arms, a pulley carried thereby and engaging the line, means within the crab for operating the pulley to cause the crab to travel along the line, and means for energizing the crab and arms.

8. A device of the kind described, comprising in combination with a sweep line and means for supporting it, a crab movably supported by the line, a pulley carried by the crab and engaging the line, means within the crab for operating the pulley to cause the crab to travel along the line, means for supplying energy to the operating means, electro-magnetic coils carried by the crab, and means for supplying electric energy to the coils.

9. A device of the kind described, comprising in combination with a sweep line and vessels for supporting and towing the line, a crab applied to the sweep line and consisting of a body portion having its own motor and an electro-magnet, arms connected to the crab and extending therefrom in opposite directions, and means for supplying current to the motor and electro-magnet.

10. A device of the kind described, comprising in combination with a sweep line and means for supporting and towing the line, a crab consisting of a body portion having an electro-magnet, arms connected to the crab and extending therefrom in opposite directions, a driving pulley carried by the crab and engaging the sweep line, a motor for operating the pulley and thereby automatically propelling the crab along the sweep line and means for supplying energy to the motor and the electro-magnet.

11. A device of the kind described, comprising in combination with a sweep line and means for supporting and towing the line, a crab, a tow line connected thereto at one end and having its opposite end carried by a towing vessel, a pulley carried by the crab and engaging the sweep line, a motor arranged within the crab for operating the pulley, a cable connected at one end to the crab and having its opposite end carried by the towing vessel, current wires extending through the cable and connected at one end to the motor and adapted to supply electric energy thereto, magnetic coils carried by the crab, means carried by the towing vessel for energizing the coil and having current wires extending therefrom through the said cable to the terminals of the coil.

12. A device of the kind described, comprising in combination with a sweep line, and means for supporting it, a crab supported upon the line, a pulley carried by the crab and engaging the line, means for operating the pulley and thereby automatically propelling the crab along the line, means for supplying energy to the said means, a float connected to the crab, and a towing line connected to the crab.

13. A device of the kind described, comprising in combination with a sweep line, a crab mounted thereon and adapted to travel along the length thereof, means mounted upon and forming part of the crab for drawing it along the length of the line, means for supplying energy to the said means, magnetic coils surrounding a portion of the crab, means for energizing the coil, a float connected to the crab, and a towing line also connected to the crab.

14. A device of the kind described, comprising in combination with a sweep line and means for supporting and towing the line, a crab having arms extending therefrom and carrying guide pulleys which engage the said line, a pulley carried by the crab and around which the line is looped, means within the crab for operating the pulley, means for supplying energy to the said means, and a towing line connected to the crab.

15. A device of the kind described, comprising in combination with a sweep line, a crab mounted upon the line and having arms radiating therefrom, guide pulleys journaled upon the arms and around which the line passes, a pulley carried by the crab and around which the line is looped, a motor for operating the last mentioned pulley, means for supplying energy to the motor, a magnetic coil carried by the crab, and means for supplying electric current to the coils.

16. In a device of the kind described, the combination with a sweep line, and means for supporting and towing the line, of a self-propelling crab mounted upon the line and adapted to travel thereon, a tow line connected at one end to the crab, and a towing vessel at its opposite end, an electro-magnet core formed upon the crab, electro-magnetic coils surrounding the core, and means for supplying energy to the coil.

17. In a device of the kind described, the combination with a sweep line and vessels for supporting and towing the line and which are adapted to travel some distance apart, of a self-propelling crab carried by the tow line and adapted to move along the length thereof, an electro-magnet arranged in the crab, and wires connected to the terminals thereof for supplying electric energy to the magnet.

18. In a device of the kind described, the combination with a towing line, of a crab connected thereto and having an electro-magnet arranged therein, a motor on the crab and wires connecting the terminals of the magnet for supplying current thereto for energizing the crab.

19. The combination with a towing line, of a crab connected thereto and having an electro-magnetic core extending therefrom, and laterally projecting arms or flukes extending from the core, electro-magnetic coils surrounding the core and wires connecting the terminals of the coils for supplying current and a propeller attached to and forming part of the crab.

20. In a device of the kind described, the combination with a sweep line and means for supporting it, of a crab or finder carried by the line, arms or flukes extending from the crab and having guide pulleys engaging the line, a drive pulley mounted upon the crab and around which the line passes, a motor for operating the pulley and having means connected thereto for supplying it with energy, a friction pulley operatively connected with the motor and engaging the line adjacent to the drive pulley, and means carried by the crab for energizing it and converting it into an electro-magnet.

21. In a device of the kind described, the combination with a sweep line and means for supporting it, of a crab or finder carried by the line and having arms or flukes extending therefrom in opposite directions, guide pulleys around which the line passes, a drive pulley carried by the crab and around which the line is looped, a motor for operating the drive pulley, means for supplying energy to the motor, an electro-magnetic core carried by the crab and connected with the arms or flukes, electro-magnetic coils surrounding the core and having wires connected to the terminals thereof for supplying electric energy to the coils, a flanged sleeve surrounding the coils, and a friction pulley operatively connected with the motor and engaging the sweep line adjacent to the drive pulley.

22. A crab or finder of the kind described, comprising a hollow body portion, having an extension, arms or flukes carried by the extension, guide pulleys journaled upon the arms or flukes, an electric motor arranged within the hollow body portion, a pulley mounted upon the body portion and operatively connected to the drive shaft of the motor and adapted for engagement with a sweep line, which also engages the said guide pulleys, a friction pulley journaled upon the crab and operatively connected with the drive shaft of the motor, said friction pulley being arranged adjacent to the first mentioned pulley to contact with the sweep line and cause it to bind tightly against the said first mentioned pulley, and wires connected to the motor for supplying energy thereto.

23. A crab or finder of the kind described, comprising a hollow body portion having an extension, a casting connected to the extension and having arms or flukes projecting in opposite directions and which are formed with step-like flanges, electro-magnetic coils surrounding the extension, a motor having its drive shaft provided with a pinion, a pulley mounted upon the crab and having its inner end provided with a gear, a train of gears carried by the crab and connecting the drive pinion of the motor with the gear of the said pulley, a friction pulley mounted upon the crab, the shaft of which is provided with a gear which is interposed in the train of gears, said pulley being arranged adjacent to the first mentioned pulley and having a frictional contacting ring and collar adjustably held upon its periphery which engages the ring, all for the purpose specified.

24. A crab or finder of the kind described, comprising a hollow body portion pointed at one end, and having a cylindrical extension projecting from its opposite end, electro-magnetic coils surrounding the extension, a casting connected to the extension and comprising a central portion having arms or flukes radiating therefrom, guide pulleys mounted upon the casting, a sleeve having peripheral flanges upon its upper surface surrounding the coil, guide pulleys carried by the sleeve, a drive pulley journaled upon the casing and adapted for engagement with a guide line, the shaft of the pulley extending within the hollow body portion of the casing, a packing arranged in the periphery of the pulley, a frictional pulley journaled upon the crab adjacent to the drive pulley, a packing carried by the frictional pulley, a collar threaded upon the said pulley and adapted to engage the packing to compress and increase the diameter thereof, an electric motor held in the body portion of the casing and having its shaft provided with a gear which is operatively connected with the said drive pulley and frictional pulley through a train of gears, current wires connected to the motor, current wires connected to the terminals of the said coils, and a coupling sleeve connected to the casing and through which the said current wires pass, all as specified.

In testimony whereof I have hereunto set my hand this 9th day of March A. D. 1907.

SIMON LAKE.

Witnesses:
 M. D. BLONDEL,
 HENRY HASPER.